July 14, 1964
F. STRAUMANN
3,140,895
DETACHABLE ARMREST FOR AUTOMOBILE SEATS
Filed Sept. 27, 1963
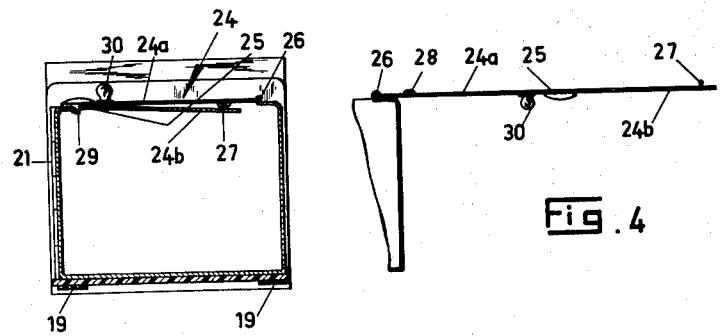
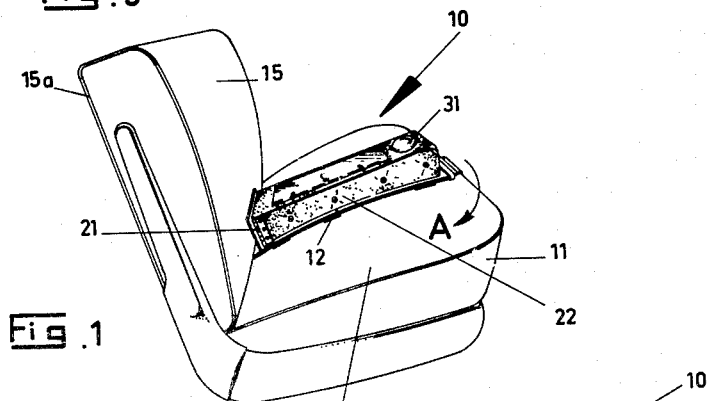
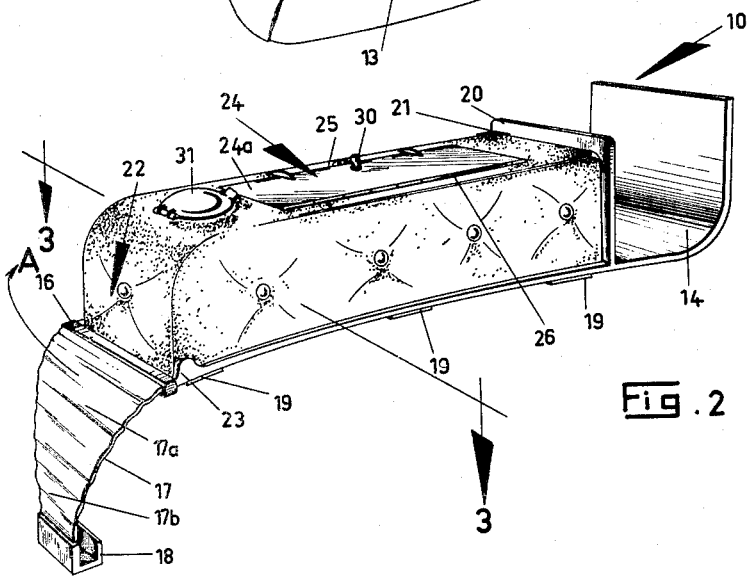
INVENTOR
Fred Straumann

United States Patent Office 3,140,895
Patented July 14, 1964

3,140,895
DETACHABLE ARMREST FOR
AUTOMOBILE SEATS
Fred Straumann, 376 Bent Crescent,
Richmond Hill, Ontario, Canada
Filed Sept. 27, 1963, Ser. No. 312,145
3 Claims. (Cl. 297—194)

This invention relates generally to armrests as applied to automobiles and more particularly to improvements in auxiliary armrests for use therewith.

The provision of armrests in automobiles has not, heretofore been considered a standard feature, such devices generally being included in the more expensive models or in the "deluxe" versions of standard models. A study of the prior art in the field of armrests reveals certain devices adapted for use as supports and rests, generally being located permanently and centrally of the bench type seat and usually having means included in their construction whereby they may be retracted into the back portion of the seat upon their not being required for continuous use.

A majority of these prior devices appear to fulfill their basic functions as an armrest, particularly for the driver of the vehicle, and some added features are to be found among the more recent designs such as, for instance, the utilization of the interior thereof for a storage compartment wherein smaller personal items may be retained. However, upon closer study of existing and past models of armrests it would appear that little substantial development of the item in a functional sense has been attempted. While this holds true of the built-in armrests found in the more expensive models it becomes even more apparent upon examination of auxiliary or removable rests of this nature.

Having in mind, therefore, the utility of an armrest within a vehicle, particularly as applied to the driver of the vehicle, and wishing to improve the design and functions of such items, it is a major object of the instant invention to provide an auxiliary armrest for automobiles and the like, referred to hereinafter by the abbreviated term arm rest, which may be adapted for optional use on either the front or rear seats of an automobile.

Another important object of the invention is to provide an armrest which may readily be adjusted to preference for use in either the central portion of a seat or at one or the other side thereof.

Yet another object of this invention resides in the provision of an armrest which may be installed within a vehicle prior to its leaving the assembly line, or installed retroactively after a person has purchased the vehicle, such installation requiring no special tools or equipment.

Still another object of the invention seeks to provide an armrest which, due to its construction and method of mounting within a vehicle, will permit the driver of the vehicle to swing the armrest away from him in a horizontal plane thereby allowing himself free access to the opposite side of the vehicle for opening the door or the like. This may only be achieved with conventional armrests by first recessing them in the seat back.

A further object of the invention provides an armrest which is adapted to serve as a convenient storage compartment for such items as road maps, writing materials, small tools and the like which the driver may have frequent need of using.

Yet a further object of my invention provides an armrest which includes in its construction a fold away writing shelf adapted to extend horizontally and parallel with the seat upon its being required for use.

Still a further object of this invention provides an armrest which may, due to its length and configuration doubles as a knee side support, particularly on extended journeys, during which the driver's right leg often becomes fatigued.

Yet another object of the instant invention resides in the provision of an armrest of the character herein specified which is highly efficient in operation, simple in construction and, consequently relatively inexpensive to manufacture.

These and various other pertinent objects and features of the instant invention will become more readily apparent from a study of the following detailed description of component parts and their specific arrangement and when taken in conjunction with the accompanying drawings which form part of this specification and wherein like characters of reference designate like parts in the several views and in which:

FIG. 1 is a perspective view of an auxiliary rest embodying the invention and shown installed upon a conventional "bench" type automobile seat.

FIG. 2 is an enlarged perspective view of the invention as illustrated in FIG. 1 and showing the means whereby the armrest is secured to an automobile seat.

FIG. 3 is a sectional end elevation of the invention as illustrated in FIGS. 1 and 2, taken on the line 3—3.

FIG. 4 is a fragmentary sectional end elevational view of the invention showing particularly the writing table in its extended position.

Referring to FIGS. 1 and 2, an armrest for automobiles generally designated by the arrow 10 and shown mounted on an automobile seat 11 which includes a baseplate 12, baseplate 12 being formed preferably from sheet plastic material and having a substantially elongate rectangular configuration.

Baseplate 12, which is so formed as to accommodate itself to the shallow arcuate radius on the upper surface 13 of an automobile seat 11, has a projecting rear section 14 adapted for insertion between upper surface 13 of seat 11 and the backrest 15 thereof, section 14 being curved upwardly through substantially 90 degrees to the horizontal portion of baseplate 12 and being disposed in contiguity with the rear face 15a of backrest 15 when mounted in position.

A retaining band or strap 17 has its first end 17a securely affixed to the terminal end 16 of baseplate 12. Strap 17, which should preferably be formed from an elastic material having a moderate degree of resiliency, has affixed to its second end 17b, a hook member 18, hook 18 being of a V channel configuration and adapted to hook against the front lower edge of the seat 11 thereby holding baseplate 12 securely in position upon upper surface 13 of seat 11.

In order to obviate any tendency of baseplate 12 to move sideways a plurality of friction pads 19 are affixed to the underside thereof, pads 19, which may be formed of any suitable resilient material having high friction characteristics, thereby minimizing the possibility of displacement of armrest 10.

A support plate 20 integral with and extending perpendicularly upwardly from baseplate 12 is located substantially toward rear section 14 thereof, the space therebetween being equal to the width of the backrest of an average automobile at their particular position.

Hingeably affixed by means of a vertically mounted, hinge plate 21 to the right hand side of support plate 20 is the arm support portion 22 of auxiliary armrest 10. Support portion 22, which should preferably be upholstered in a resilient material for comfort, is of conventional armrest configuration, that is, substantially parallelepiped and having its undersurface supplied with a radius conforming to that of baseplate 12. Support portion 22 is securely held in its operable position by means of a press fit stud member 23 on the forward left hand corner of baseplate 12, member 23 being received and releasably retained by a co-operable orifice formed in support portion 22.

Hinge 21, therefore allows support portion 22 to be swung vertically outwardly from the driver of an automobile, thereby permitting him to lean over, for instance, to open the opposite door to let in a person, whereafter he may reset armrest 10 in place merely by pulling support portion 22 toward him.

Referring now to FIGS. 2, 3 and 4, support portion 22, which is of hollow construction, is adapted to house therein an extending platform or table member 24. Table 24 which includes two sections or leaves 24a and 24b, respectively joined by a first hinge unit 25, is hingeably affixed within a cooperable cutout section formed in the upper surface of support portion 22, a second hinge unit 26 joining one edge of section 24a to the pertinent edge of the said cut out section formed within support portion 22. First hinge unit 25 permits section 24b to hinge through one hundred and ninety degrees, thereby enabling the two sections to provide a single platform. Similarly second hinge unit 26 permits section 24b also to hinge through one hundred and ninety degrees. Thus, a horizontally disposed "table top" or platform may be constructed whenever required. Upon table 24 not being required, the two sections 24a and 24b are folded together along hinge 25 and retained in this attitude by means of a male stud 27 formed on section 24b and a female housing 28, stud 27 being inserted therewithin and retained frictionally; sections 24a and 24b being thereupon folded over on second hinge 26 and neatly located within the top of support portion 22.

It should be noted that the edge of the cut out section in support portion 22, which is opposite the hinged edge, is formed into a downwardly and inwardly projecting channel or lip 29, lip 29 being adapted to receive and support the folded sections 24a and 24b of table 24 therewithin.

A gripping knob 30 is located on section 24a and projects perpendicularly upwardly therefrom when table 24 is folded into support portion 22, and a hinge lidded ash tray 31 may also be located within support portion 22, preferably in a forward location thereon.

Support portion 22 of armrest 10, being of hollow construction may therefore be utilized to store personal items the driver has frequent recourse to, thereby providing useful additional storage space to supplement the rather limited space provided by the average "glove" compartment of an automobile.

A secondary, but nonetheless relevant feature of armrest 10 is its capability of providing a side support for a driver's right leg. Often, this leg, which does the majority of the work in present day automobiles, becomes fatigued, particularly on long journeys. Armrest 10 is made of such a length as to bring its end section substantially level with the front edge of the automobile seat, and is thereby ideally positioned to give a side support to the leg, the knee of the averagely proportioned driver being level therewith.

It will be readily apparent that in use armrest 10 is quickly mounted in the desired location on automobile seat 11, by inserting rear section 14 thereof between the upper surface 13 of seat 11 and the backrest 15 thereof as heretofore described and hooking retaining strap 17 to the lower forward edge of seat 11.

Conversely, upon the full length of seat 11 being required, armrest 10 is quickly disengaged and removed therefrom.

The general design of the individual parts of the invention as described above may be varied according to requirements of manufacture and production thereof while still remaining within the spirit and principle of the invention, without prejudicing the novelty thereof.

The embodiments of this invention in which an exclusive property or privilege is claimed are defined as follows:

1. A detachable armrest for use with automobile seats and comprising a baseplate having an arcuate configuration, thereby adapted to conform to an automobile seat; a rear end curved upwardly from said baseplate, whereby said end is secured behind the back of said seat to prevent forward movement of said baseplate; a band of resilient elastic material secured to the front of said baseplate; a hook secured to the free end of said strap whereby said baseplate is secured to said seat by said hook engaging with the underside of said seat, said strap resiliently holding said baseplate; a plurality of friction pads secured to the underside of said baseplate, thereby preventing movement of said baseplate sideways on said seat; a plate secured to the rear of said baseplate and extending vertically, upwardly therefrom; a hollow block of substantially rectangular configuration and extending the length of said baseplate, said block being hingeably secured to one side of said plate, whereby said block can be swung away from said baseplate and an upholstered pad on the top of said block.

2. A detachable armrest for use with automobile seats and comprising a baseplate having an arcuate configuration, thereby adapted to conform to an automobile seat; a rear end curved upwardly from said baseplate, whereby said end is secured behind the back of said seat to prevent forward movement of said baseplate; a band of resilient, elastic material secured to the front of said baseplate; a hook secured to the free end of said strap whereby said baseplate is secured to said seat by said hook engaging with the underside of said seat, said strap resiliently holding said baseplate; a plurality of friction pads secured to the underside of said baseplate, thereby preventing movement of said baseplate sideways on said seat; a plate secured to the rear of said baseplate and extending vertically, upwardly therefrom; a hollow block of substantially rectangular configuration and extending the length of said baseplate, said block being secured to one side of said plate, whereby said block can be swung away from said baseplate; an ashtray incorporated in said pad and a padded lid hingeably secured to the top of said block, covering the hollow interior thereof to provide a storage space.

3. A detachable armrest for use with automobile seats and comprising a baseplate having an arcuate configuration, thereby adapted to conform to an automobile seat; a rear end curved upwardly from said baseplate, whereby said end is secured behind the back of said seat to prevent forward movement of said baseplate; a band of resilient, elastic material secured to the front of said baseplate; a hook secured to the free end of said strap whereby said baseplate is secured to said seat by said hook engaging with the underside of said seat, said strap resiliently holding said baseplate; a plurality of friction pads secured to the underside of said baseplate, thereby preventing movement of said baseplate sideways on said seat; a plate secured to the rear of said baseplate and extending vertically, upwardly therefrom; a hollow block of substantially rectangular configuration and extending the cured to one side of said plate, said hinge being located in substantially vertical position, whereby said block can be swung away from said baseplate in a substantially horizontal plane; an upholstered pad on the top of said block; an ashtray incorporated in said pad; a padded lid hingeably secured to the top of said block, covering the hollow interior thereof to provide a storage space and a writing shelf foldably secured within said storage space and adapted to fold outwardly from said space upon said lid being open, thereby to provide a writing surface.

References Cited in the file of this patent

UNITED STATES PATENTS

| | | | |
|---|---|---|---|
| Re. 24,805 | Morrill | Mar. 29, | 1960 |
| 2,196,863 | Hassenfeld | Apr. 9, | 1940 |
| 2,533,147 | Sparks | Dec. 5, | 1950 |
| 2,633,180 | Reed | Mar. 31, | 1953 |
| 2,692,638 | Castell | Oct. 26, | 1954 |
| 2,704,114 | Williams | Mar. 15, | 1955 |
| 2,726,710 | Cutler | Dec. 13, | 1955 |
| 2,736,320 | Roberts | Feb. 28, | 1956 |
| 3,083,998 | Morris | Apr. 2, | 1963 |